(12) United States Patent
Rhee et al.

(10) Patent No.: US 8,407,622 B2
(45) Date of Patent: Mar. 26, 2013

(54) PORTABLE DEVICE AND METHOD OF PROVIDING MENU ICONS

(75) Inventors: Young-ho Rhee, Seoul (KR); Joon-ho Ok, Seoul (KR); Sang-hyun Park, Seoul (KR); Soo-ho Cho, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 496 days.

(21) Appl. No.: 11/723,857

(22) Filed: Mar. 22, 2007

(65) Prior Publication Data
US 2007/0288868 A1 Dec. 13, 2007

(30) Foreign Application Priority Data

Jun. 9, 2006 (KR) ........................ 10-2006-0052221

(51) Int. Cl.
*G06F 3/048* (2006.01)
(52) U.S. Cl. .................. 715/840; 715/782; 715/810
(58) Field of Classification Search .................. 715/840, 715/810, 782
See application file for complete search history.

(56) References Cited

U.S. PATENT DOCUMENTS

| | | | | |
|---|---|---|---|---|
| 5,608,850 A * | 3/1997 | Robertson | ..................... | 345/427 |
| 5,671,381 A * | 9/1997 | Strasnick et al. | ............. | 715/848 |
| 5,687,331 A | 11/1997 | Volk et al. | | |
| 6,005,578 A | 12/1999 | Cole | | |
| 6,014,145 A * | 1/2000 | Bardon et al. | ................ | 345/427 |
| 6,104,402 A * | 8/2000 | Goddard et al. | ............. | 345/419 |
| 6,215,505 B1 * | 4/2001 | Minami et al. | ................ | 345/473 |
| 6,323,856 B1 * | 11/2001 | Smilansky et al. | ........... | 345/418 |
| 6,417,850 B1 * | 7/2002 | Kang | ........................... | 345/422 |
| 6,448,987 B1 | 9/2002 | Easty et al. | | |
| 6,522,347 B1 * | 2/2003 | Tsuji et al. | ..................... | 715/848 |
| 7,139,034 B2 * | 11/2006 | Kennedy et al. | .............. | 348/601 |
| 2001/0046896 A1 * | 11/2001 | Miyamoto et al. | .............. | 463/31 |
| 2002/0033849 A1 * | 3/2002 | Loppini et al. | ................ | 345/848 |
| 2002/0123368 A1 | 9/2002 | Yamadera et al. | | |
| 2004/0100479 A1 * | 5/2004 | Nakano et al. | ................ | 345/700 |
| 2005/0034081 A1 | 2/2005 | Yamamoto et al. | | |
| 2005/0086611 A1 | 4/2005 | Takabe et al. | | |
| 2006/0095865 A1 | 5/2006 | Rostom | | |
| 2008/0094358 A1 * | 4/2008 | Sullivan | ........................ | 345/161 |

(Continued)

FOREIGN PATENT DOCUMENTS

CN 1373595 A 10/2002
EP 0 685 790 A2 12/1995

(Continued)

OTHER PUBLICATIONS

Communication from the State Intellectual Property Office of P.R. China issued on Apr. 13, 2011 in counterpart Chinese application No. 200710108993.4.

*Primary Examiner* — William Bashore
*Assistant Examiner* — Gregory A DiStefano
(74) *Attorney, Agent, or Firm* — Sughrue Mion, PLLC (57) ABSTRACT

A portable device and a method of providing menu icons are provided. The portable device includes a button signal determination unit, a focus location checking unit, a background screen management unit, and an icon management unit. The button signal determination unit determines whether an input button signal is the signal of a function button or the signal of a direction button when the button signal is received from a user. The focus location checking unit determines a location of a focus located on a specific menu icon. The background screen management unit changes the view point of a background screen to a direction in which the focus is moved. The icon management unit changes the size of a menu icon based on the location of the focus.

8 Claims, 11 Drawing Sheets

U.S. PATENT DOCUMENTS

2010/0083165 A1 * 4/2010 Andrews et al. .............. 715/784

FOREIGN PATENT DOCUMENTS

| EP | 1303114 A2 | 2/2002 |
| EP | 1 510 911 A2 | 3/2005 |
| JP | 2000-156876 A | 6/2000 |
| JP | 2000-194460 A | 7/2000 |
| KR | 10-2001-0018568 A | 3/2001 |
| KR | 10-2003-0088374 A | 11/2003 |
| WO | WO 2007125648 A1 * | 11/2007 |

* cited by examiner

PORTABLE DEVICE AND METHOD OF PROVIDING MENU ICONS

CROSS-REFERENCE TO RELATED PATENT APPLICATIONS

This application claims priority from Korean Patent Application No. 10-2006-0052221 filed on Jun. 6, 2006 in the Korean Intellectual Property Office, the disclosure of which is incorporated herein by reference in its entirety.

BACKGROUND OF THE INVENTION

1. Field of the Invention

Apparatuses and methods consistent with the present invention relate to providing menu icons and, more particularly, to a portable device and method of providing menu icons, which display upper-level icons and the lower-level icons thereof in a hierarchical fashion.

2. Description of the Related Art

Recently, with the rapid development of communication technology, portable devices for enabling individuals to perform voice and data communication while moving have been developed and widely popularized.

In general, portable devices can be convenient communication tools that are frequently used in daily life, as when individuals perform voice or video communication or exchange information, such as text messages, with counterparts and access the Internet while carrying the portable devices. Examples of such portable devices include mobile telephones, portable phones, hand-held phones, cellular phones, Personal Communications Service (PCS) phones, personal portable phones, wireless communication terminals, Wireless Application Protocol (WAP) phones, Personal Digital Assistants (PDAs), and International Mobile Telecommunications 2000 (IMT2000) terminals.

Figure 1:
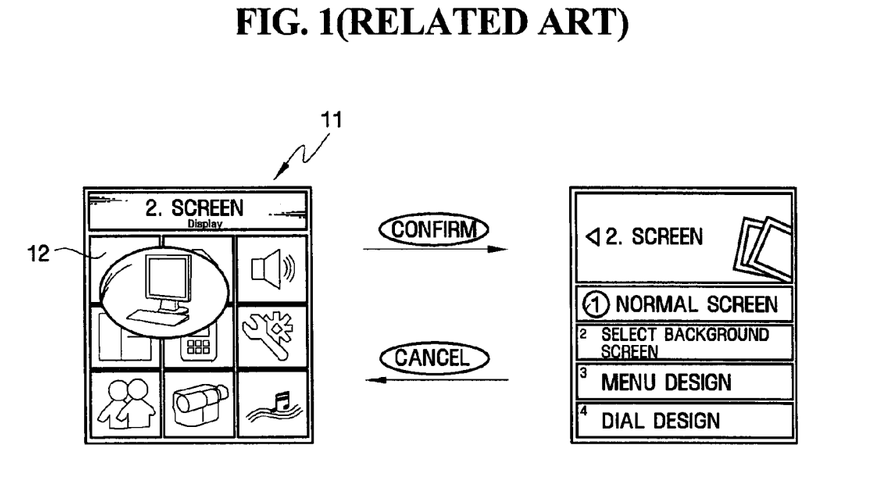
FIG. 1 is a diagram illustrating the menu screen of a related art portable device.

FIG. 1 illustrates the menu screen of a related art portable device.

As shown in FIG. 1, a related art method of displaying various menus for performing the functions of the portable device is a method of providing two-dimensional (2D) or three-dimensional (3D) image objects to a display panel 11.

To perform a specific function, however, a user must select a plurality of menu icons 12 one by one and search among detailed menu items included in a selected menu icon 12, which may be inconvenient.

That is, when a user does not know a menu icon under which a desired function is listed, the user must select displayed menu icons 12 one by one. Furthermore, when a functional item to be used does not exist in a selected menu icon, the user must move to an upper menu icon in order to move back down the menu to another menu icon. Accordingly, it is inconvenient that the user must perform button manipulation, that is, button selection, several times in order to search for the desired function.

In Korean Patent Laid-Open Publication No. 2003-88374 entitled "Portable Information Terminal Device, Display Control Device, Display Control Method and Computer-Readable Programs thereof", a menu panel for displaying menu items is arranged such that a normal line is oriented toward a virtual camera, with a display location set along a corresponding trajectory, and transparency is set to a high value depending on the distance from the virtual camera. If scrolling manipulation is performed, the menu panel moves along trajectories between the display locations until the selected menu panel moves to a display location. The patent discloses a technique in which the display screen of the portable information terminal device is represented as a screen image by the virtual camera and the menu panel is three-dimensionally displayed in a roll form. However, this invention has a drawback in that only the height of the camera can be adjusted and the menu screen is not continuously provided as one screen, as in a conventional portable information terminal device.

SUMMARY OF THE INVENTION

According to an exemplary aspect of the present invention, there is provided a portable device for providing menu icons. The portable device includes a button signal determination unit which, when an input button signal is received from a user, determines whether the input button signal is the signal of a function button or the signal of a direction button; a focus location checking unit which determines a location of a focus located on a menu icon; a background screen management unit which changes a view point of a background screen in accordance with a direction in which the focus is moved; and an icon management unit which changes a size of a menu icon based on the location of the focus.

According to another aspect of the present invention, there is provided a method of controlling a portable device for providing menu icons. The method includes receiving a button signal generated through a user's manipulation of a button; if the input button signal is a signal of a direction button, the signal comprising an input direction, determining a location of a focus located on an upper-level icon and moving the location of the focus in the input direction; if the location of the focus is moved, changing a view point of a background screen to the direction of the movement of the focus; and changing a size of a menu icon based on the location of the focus.

BRIEF DESCRIPTION OF THE DRAWINGS

The above and other exemplary aspects and advantages of the present invention will be more clearly understood from the following detailed description of exemplary embodiments of the present invention, taken in conjunction with the accompanying drawings, in which.

DETAILED DESCRIPTION OF EXEMPLARY EMBODIMENTS OF THE INVENTION

The present invention will now be described in detail in connection with exemplary embodiments with reference to the accompanying drawings.

Figure 2A:
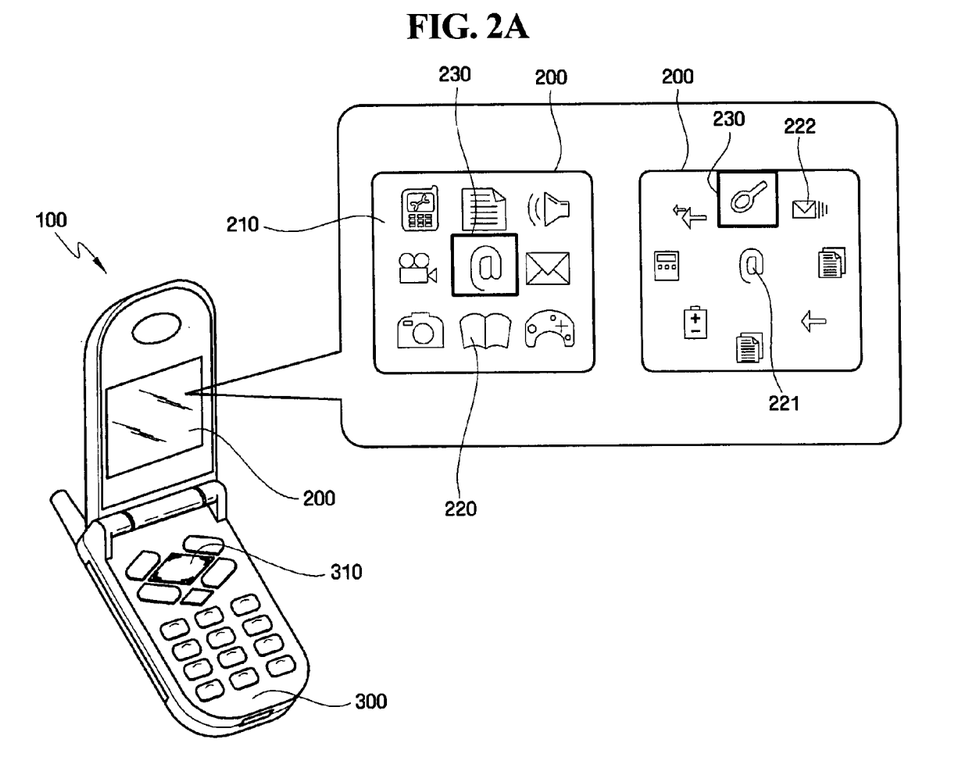
FIGS. 2A and 2B illustrate the screens of a portable device that provide menu icons according to an exemplary embodiment of the present invention.
Figure 2B:
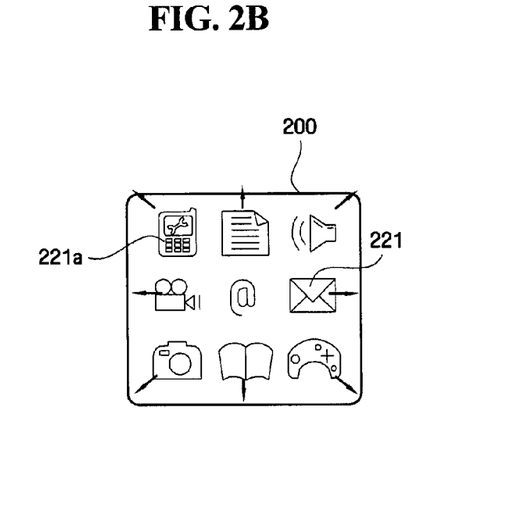

FIGS. 2A and 2B illustrate the screens of a portable device that provide menu icons according to an exemplary embodiment of the present invention. In FIG. 2, a portable device 100 is a device, such as a mobile phone, a PDA or a wired communication terminal, that allows a user to communicate with and send a text message to a counterpart and to access the Internet.

As shown in FIG. 2A, the portable device 100 includes a display panel 200 for displaying a plurality of menu icons 221 and 222, and an input device 300 for manipulating the menu icons 221 and 222 displayed on the display panel 200. The menu icons 221 and 222 include characters, web pages, diagrams, moving images, etc., which are two-dimensionally or three-dimensionally displayed, and also include Graphical User Interface (GUI) components, such as pull-down menus and buttons. Furthermore, the menu icons 221 and 222 are classified into upper-level icons 221 and lower-level icons 222 which are sub-icons under one of the upper-level icons 221.

A background screen 210 and the plurality of icons 221 and 222 overlaid on the background screen 210 are displayed on the display panel 200. When a user selects one from among the displayed icons 221 and 222 in such a way as to move a focus 230 using the direction button 310 of the input device 300, the view point of the background screen 210 is changed to the direction of the direction button 310 selected by the user. Accordingly, there is an effect in which the view point of the background screen 210 seems to be changed to a direction selected by the user and the user's view moves to the direction selected by the user. In this case, the term "view point" refers to the view point of the screen that is changed according to the user's view. For example, the view point may be classified as a top view point, a bottom view point, a right view point or a left view point. The top view point refers to a view point at which the user views the screen in the upper direction thereof, the bottom view point refers to a view point at which the user views the screen in the lower direction thereof, the right view point refers to a view point at which the user views the screen in the right direction thereof, and the left view point is a view point at which the user views the screen in the left direction thereof.

The input device 300 includes function buttons for selecting and operating the icons 221 and 222 displayed on the display panel 200, and the direction button 310 for moving the focus 230 for selecting the icons 221 and 222.

For example, the direction button 310 refers to a four-direction button for moving the location of the focus 230, and the function buttons refer to an execution button for selecting and activating a menu icon 221 or 222 on which the focus 230 is located, and a return button for returning an activated icon to the previous state thereof. In this case, the function buttons may be additionally provided in the portable device 100, or may be general buttons (for example, buttons that are assigned numbers, Korean letters, English letters, etc.) that are assigned functions.

As shown in FIG. 2A, when a user selects a specific upper-level icon 221 using a specific function button of the input device 300, the lower-level icons 222 of the corresponding upper-level icon 221 are displayed.

For example, the location of the upper-level icon 221 moves in a direction (that is, the direction opposite the direction of the corresponding illustrated arrow as shown in FIG. 2B) through a specific upper-level icon (for example, an Internet (@) icon) located in the center of the screen. As shown in FIG. 2A, the lower-level icons 222 are displayed in a region in the direction (the direction of the illustrated arrow of FIG. 2B) opposite the specific upper-level icon (for example, the Internet (@) icon) located in the center of the screen. The lower-level icons 222 are disposed around the upper-level icon 221 in an arcuate arrangement. Meanwhile, the upper-level icon (for example, the Internet (@) icon) located in the center of the screen moves in the Z-axis direction (that is, a depth direction). The lower-level icons 222 are disposed around the upper-level icon 221 in a circular arrangement, and are then displayed.

The directions of illustrated arrows may include an upper direction ↑, an upper left direction ↖, an upper right direction ↗, a left direction ←, a right direction →, a lower direction ↓, a lower left direction ↙, and a rower right direction ↘.

Furthermore, when lower-level icons 222 are displayed by selecting a specific upper-level icon 221, the movement of the locations of the upper-level icon 221 and the lower-level icons 222 is displayed using a motion blur. The term "motion blur" refers to an effect of adjusting the angle of an image and blurring the image so that the image appears to move.

For example, when the user selects a mobile phone icon 221a using a function button (for example, the execution button) in the case where the focus 230 is located on the mobile phone icon 221a of the displayed upper-level icons 221, the location of the mobile phone icon 221a moves in the lower right direction ↘, and the lower-level icons 222 of the mobile phone icon 221a are displayed in the upper left direction ↖. That is, the location of the selected upper-level icon 221 moves in the direction opposite the direction of a corresponding illustrated arrow, and the lower-level icons 222 of the upper-level icon 221 are located in the direction of the arrow. The movement of the locations of the upper-level icon 221a and the lower-level icons 222 is displayed using a motion blur. An example in which lower-level icons are displayed when an upper-level icon, on which the focus 230 is located, is selected will be described in detail with reference to FIGS. 6A and 6B below.

Figure 3:
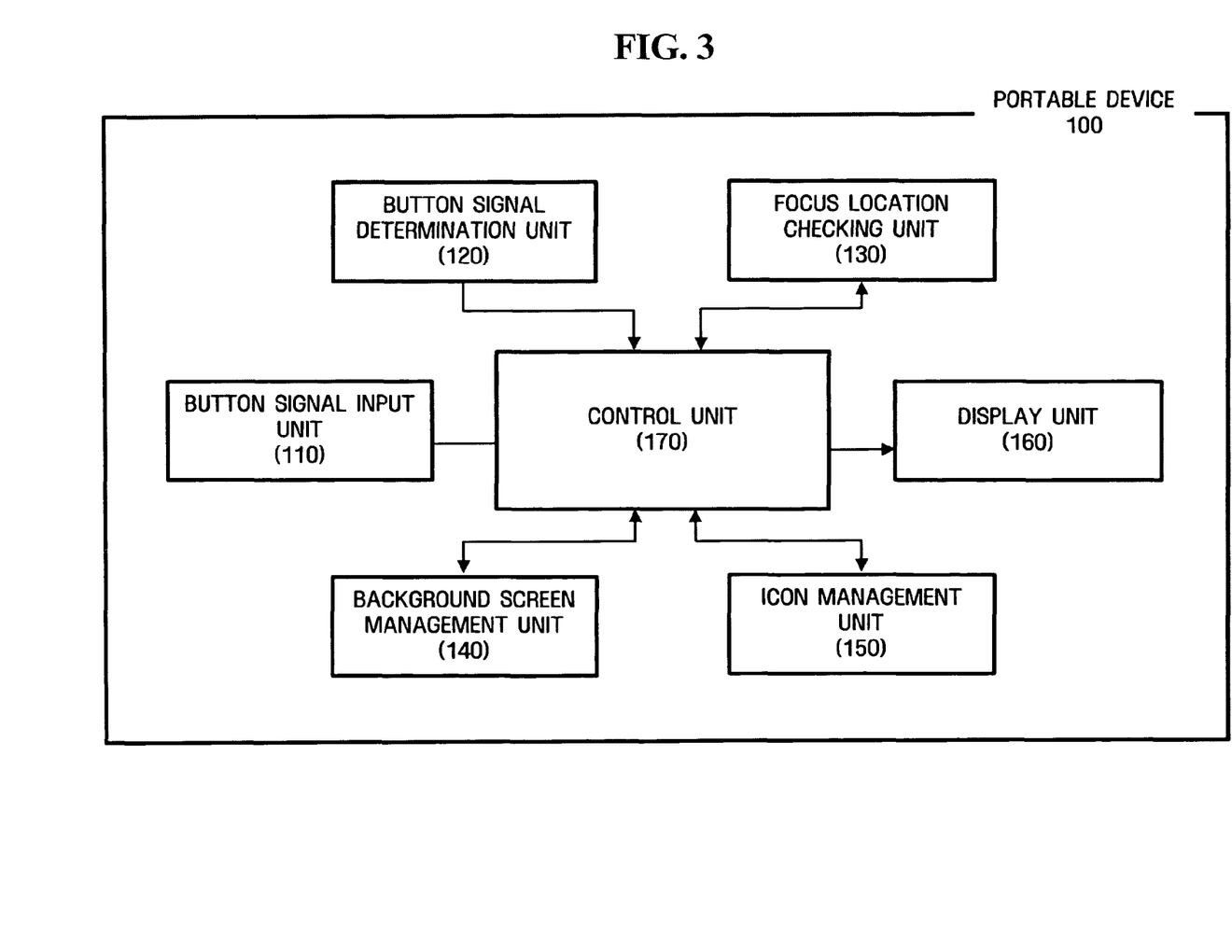
FIG. 3 is an internal block diagram of the portable device for providing menu icons according to another exemplary embodiment of the present invention.

FIG. 3 is an internal block diagram of a portable device 100 for providing menu icons according to another exemplary embodiment of the present invention.

As illustrated in FIG. 3, the portable device 100 includes a button signal input unit 110, a button signal determination unit 120, a focus location checking unit 130, a background screen management unit 140, an icon management unit 150, a display unit 160, and a control unit 170.

The term '~unit', as used herein, means, but is not limited to, a software or hardware component, such as a Field Programmable Gate Array (FPGA) or an Application Specific Integrated Circuit (ASIC), which performs certain tasks. A unit may advantageously be configured to reside on the addressable storage medium and configured to execute on one or more processors. Thus, a unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and units may be combined into fewer components and units or further separated into additional components and units.

The button signal input unit 110 receives a button signal that is generated by the user's manipulation of a button. The button signal generated by the user may include the signal of a function button for selecting and executing one of the icons 221 and 222 and the signal of a direction button for moving the focus 230 located on a specific menu icon 221 or 222.

When a signal generated by the user is received through the button signal input unit 110, the button signal determination unit 120 determines whether the received signal is the signal of a function button or the signal of a direction button. In this case, the determination of whether the received signal is the signal of a function button or the signal of a direction button is performed to determine whether the received signal requests the selection and execution of a menu icon 221 or 222 or the movement of the position of the focus 230.

The focus location checking unit 130 checks the location of the focus 230 that is located on a menu icon selected by the user, and also checks the location of the focus 230 that is moved through the user's manipulation of the direction button.

The background screen management unit 140 changes the view point of the background screen 210 to the direction of the direction button 310 selected by the user. Accordingly, as the view point of the background screen 210 is changed to the direction selected by the user, there is an effect in which the user's view seems to be changed to the direction selected by the user.

For example, when the user selects the upper direction key of the direction button 310, the background screen 210 having a view point at which the user views the screen in the upper direction thereof is displayed. That is, there is an effect in which the view point at which the user views the screen in the upper direction thereof is provided by changing the view point of the background screen 210. The background screen moved by manipulating the direction button will be described in detail with reference to FIGS. 5A to 5D below.

The icon management unit 150 changes the size of an upper-level icon 221 according to the location of the focus 230 when the focus 230 moves in the direction of the direction button 310 selected by the user. In this case, the size of the icon on which the focus 230 is located is enlarged compared to that of the other icons.

Furthermore, when the user selects an upper-level icon 221, a plurality of lower-level icons 222, corresponding to the upper-level icon, are displayed, and the focus 320 is located on one of the lower-level icons 222. In this case, the plurality of lower-level icons 222 are disposed around the upper-level icon 221 and are rotated in the direction of the direction button 310 selected by the user. Furthermore, the location of the focus 320 is a specific location on the background screen 210, and the specific location is not changed when the lower-level icons 222 move.

The display unit 160 displays the plurality of icons 221 and 222 and an image, which has been activated through the user's manipulation of the buttons, on the display panel 200. The display unit 160 also displays the focus 230 that is moved based on the user's manipulation of the buttons.

The control unit 170 controls the operation of respective functional blocks 110 to 160 that constitute the portable device 100.

Figure 4A:
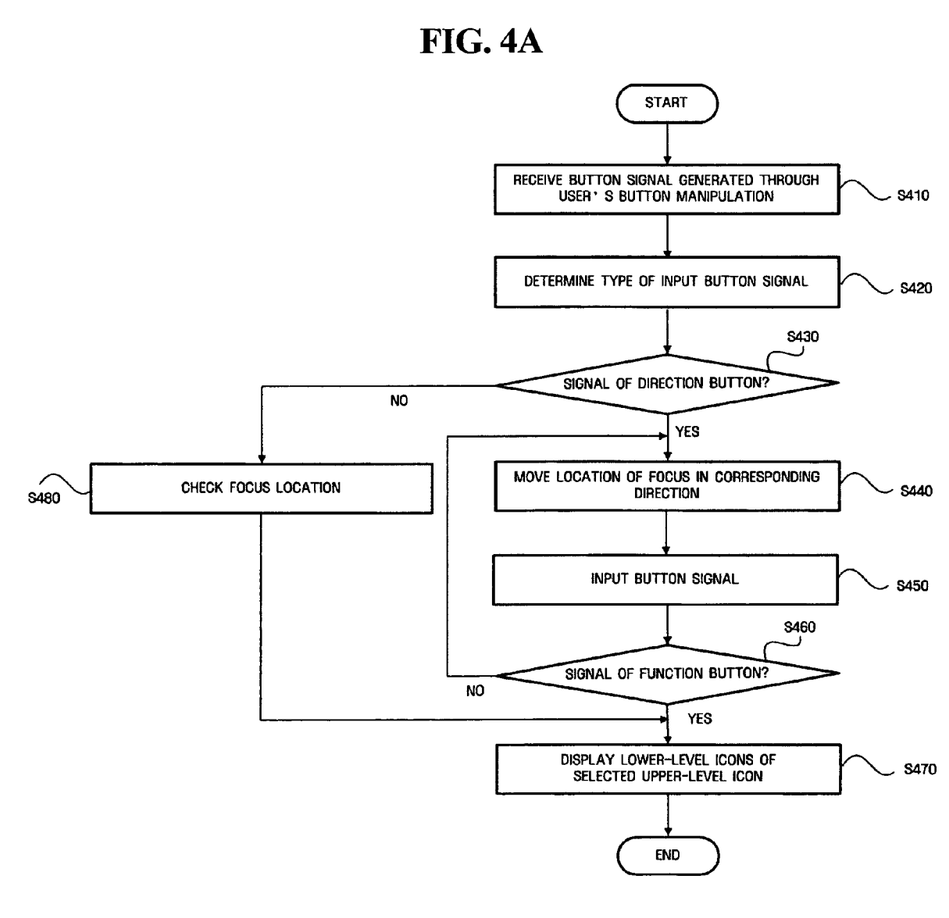
FIGS. 4A to 4C are flowcharts illustrating a method of controlling a portable device for providing menu icons according to still another exemplary embodiment of the present invention.
Figure 4B:
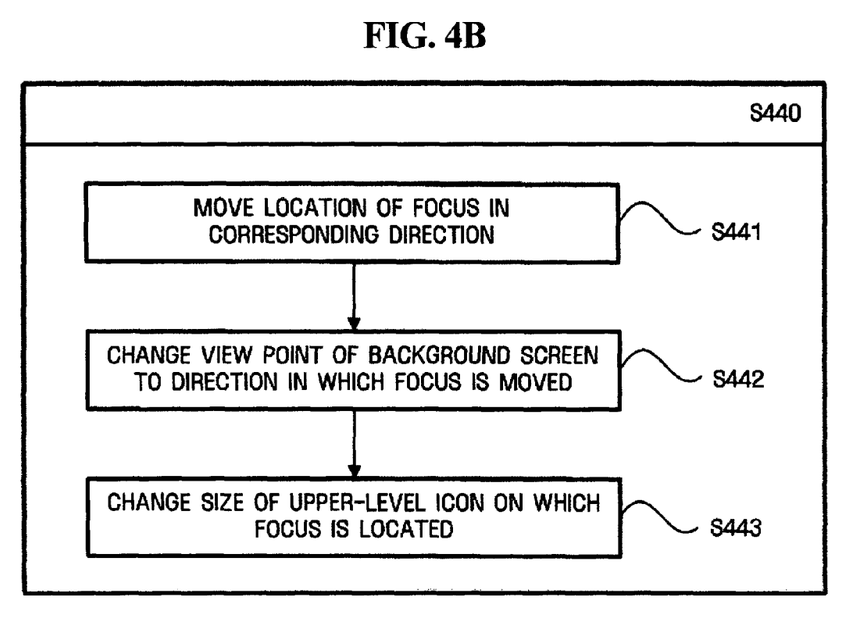
Figure 4C:
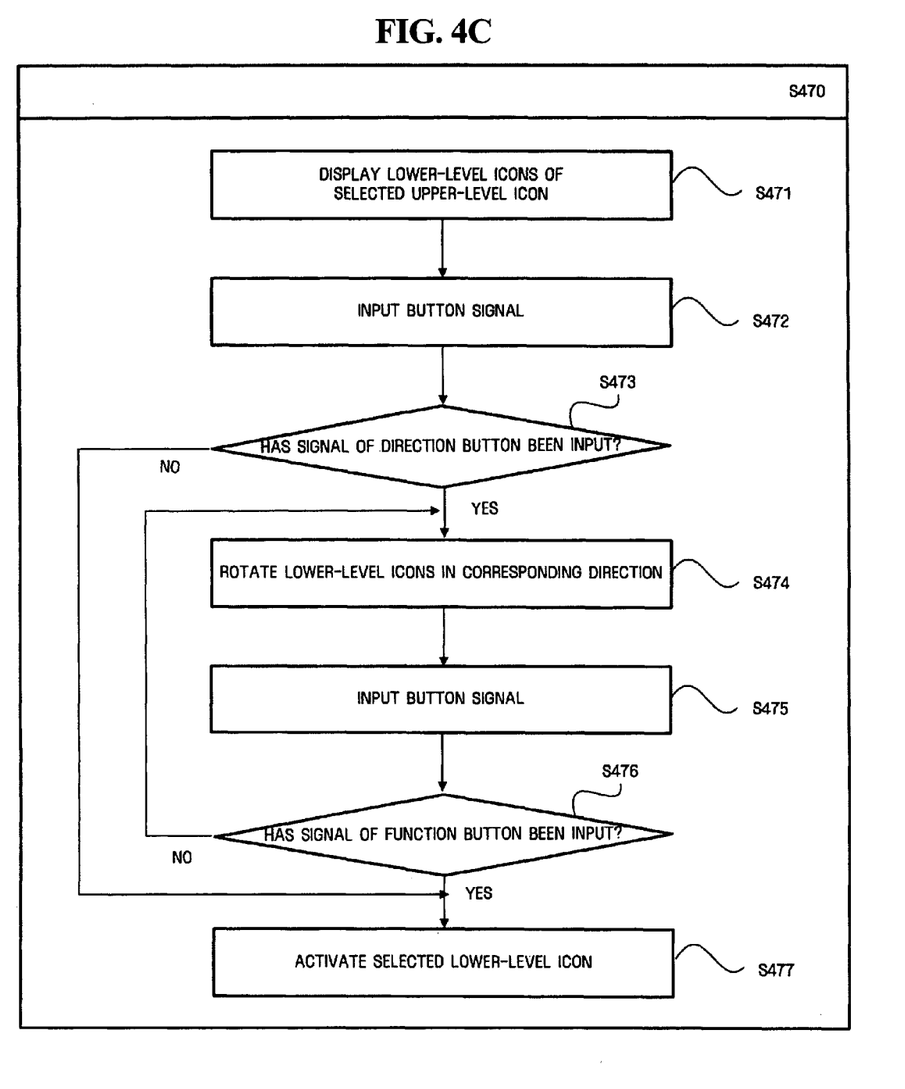

FIGS. 4A to 4C are flowcharts illustrating a method of controlling the portable device for providing menu icons according to still another exemplary embodiment of the present invention.

Referring to FIG. 4A, a user activates the menu screen using the portable device 100.

Thereafter, the user generates a signal through the manipulation of a button, and the button signal input unit 110 receives the generated button signal (S410). The button signal determination unit 120 determines the type of input button signal (S420). The button signal includes the signal of a specific function button for performing a specific function or the signal of the direction button for moving the location of the focus 230.

If the input button signal is determined to be the signal of the direction button at S430, the focus location checking unit 130 checks the current location of the focus 230 on the screen, and the control unit 170 moves the location of the focus 230, in an input direction, from the location of the focus 230 (S440). This will be described in detail below, with reference to FIG. 4B.

Thereafter, when a button signal is generated by the user (S450), the button signal input unit 110 receives the generated signal and the button signal determination unit 120 determines the type of input button signal.

If the input button signal is determined to be the signal of a function button at S460, the control unit 170 activates a selected upper-level icon 221 and displays the corresponding upper-level icon 221 and the lower-level icons 222 thereof on a screen through the display unit 160 (S470). This will be described in detail below, with reference to FIG. 4C.

Meanwhile, if the input button signal is determined to be the direction button signal at S460, the control unit 170 moves the location of the focus 230 from the current location of the focus 230 in the input direction at step S440. Thereafter, steps S450 to S470 are performed in the same manner.

Meanwhile, if the input button signal is determined to be the function button signal at step S430, the focus location checking unit 130 checks the current location of the focus 230 (S480). The control unit 170 activates a corresponding upper-level icon 221 on which the focus 230 is located, and displays the corresponding upper-level icon 221 and the lower-level icons 222 thereof through the display unit 160 (S470).

Accordingly, the upper-level icon 221 and the lower-level icons 222 are displayed on the screen in a hierarchical fashion. Accordingly, the user can be more rapidly and conveniently made aware of the locations of icons that are currently selected.

FIG. 4B is a flowchart illustrating the method of controlling the portable device for providing menu icons (S440).

If the button signal generated by the user is determined to be the signal of the direction button, the focus location checking unit 130 checks the current location of the focus 230, and the control unit 170 moves the location of the focus 230, in an input direction from the location of the focus 230 (S441).

Thereafter, when the focus 230 is moved in that direction, the view point of the background screen 210 is also changed in that direction (S442), and the size of the menu icon (for example, an upper-level icon) on which the focus 230 is located is also changed. Accordingly, there is an effect in which the view point of the background screen 210 is changed and the user's view seems to move to the direction selected by the user. Furthermore, the size of the menu icon on which the focus 230 is located is enlarged compared to that of the other icons. The background screen and the menu icon, which are moved through the manipulation of the direction button, will be described in detail with reference to FIGS. 5A to 5B below.

FIG. 4C is a flowchart illustrating the method of controlling the portable device for providing menu icons (S470).

If the button signal generated by the user is determined to be the signal of a function button, the control unit 170 activates a selected upper-level icon 221. Accordingly, the corresponding upper-level icon 221 and the lower-level icons 222 thereof are displayed through the display unit 160 (S471).

Thereafter, when the button signal generated by the user is input through the button signal input unit 110 (S472), the button signal determination unit 120 determines the type of input button signal.

If the signal of the direction button signal is determined to have been input at 5473, the displayed lower-level icons 222 are rotated in the direction of the input direction button 310 at a predetermined angle (S474). In this case, the location of the focus 230 on the screen is not changed. In other words, the lower-level icons 222 are rotated at a predetermined angle, and the focus 230 is located on a specific lower-level icon. The lower-level icons rotated through the manipulation of the direction button will be described in detail below, with reference to FIG. 6.

Thereafter, when the button signal generated by the user is input through the button signal input unit 110 at S475, the button signal determination unit 120 determines the type of input button signal.

If the signal of the function button signal is determined to have been input at S476, a corresponding lower-level icon 222 on which the focus 230 is located is activated and is then displayed on the display panel 200 through the display unit 160 (S477).

Meanwhile, if the signal of the function button is determined to have been input at S476, S474 to S477 are performed again. Furthermore, if the signal of the direction button is determined to have been input at S473, S477 is performed.

FIGS. 5A to 5D show a background screen and menu icons that are moved through the manipulation of the direction button in the portable device for providing menu icons according to still another exemplary embodiment of the present invention.

Figure 5A:
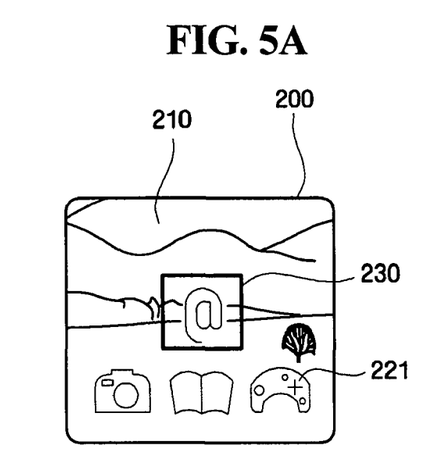
FIGS. 5A to 5D are views illustrating a background screen and menu icons that are moved through the manipulation of a direction button in the portable device for providing menu icons according to still another exemplary embodiment of the present invention.
Figure 5B:
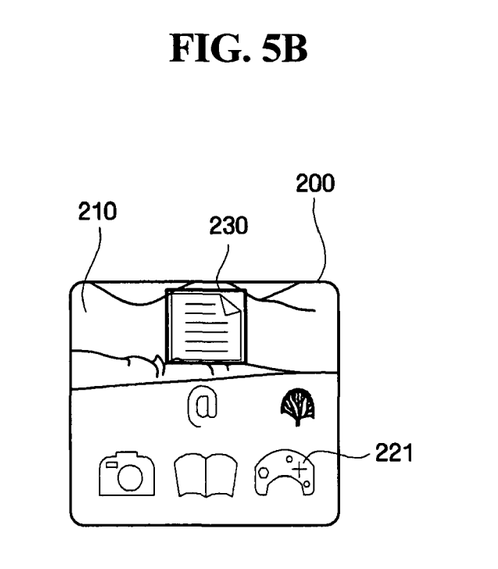
Figure 5C:
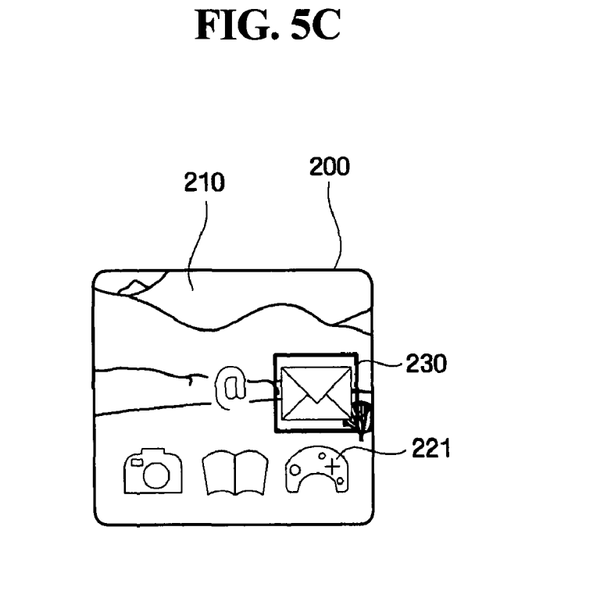
Figure 5D:
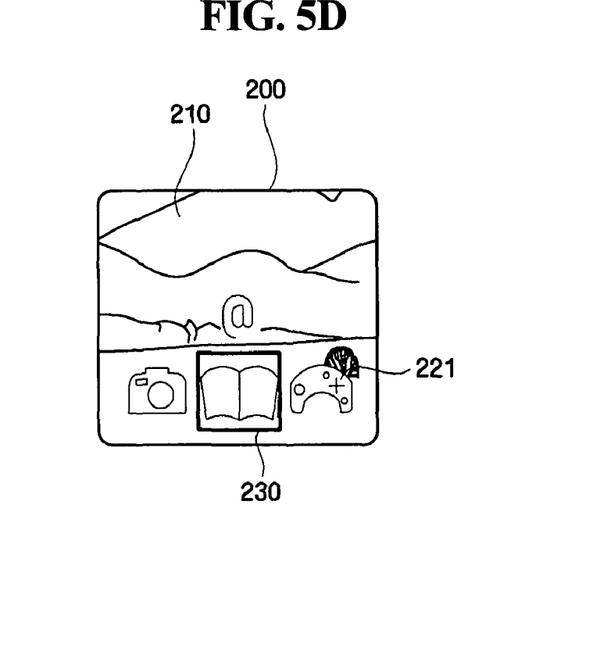

FIG. 5A shows an example in which the focus 230 is located on an upper-level icon that is displayed on the display panel 200 of the portable device 100 and is located in the center of the screen. FIG. 5B shows an example in which the focus 230 is located on the upper-level icon 221 located in the upper region of the screen. FIG. 5C shows an example in which the focus 230 is located on the upper-level icon 221 located in the left region of the screen. FIG. 5D shows an example in which the focus 230 is located on an upper-level icon located in the lower region of the screen.

In the case where the focus 230 is located on an upper-level icon (for example, the Internet @ icon) that is displayed on the display panel 200 and is located in the center of the screen, as shown in FIG. 5A, the view point of the background screen 210 is not changed. Accordingly, there is an effect in which the user views the background screen 210 from the front thereof.

Furthermore, the size of a specific upper-level icon (for example, the Internet (@) icon, on which the focus 230 is located is enlarged compared to that of the other upper-level icons, and the enlarged upper-level icon is displayed.

In the case where the focus 230 is located on the upper one (for example, a document icon) of the plurality of upper-level icons 221 displayed on the display panel 200, as shown in FIG. 5B, there is an effect in which the top view point of the background screen 210 is changed, and therefore the user seems to view the background screen 210 in the upper direction thereof.

Furthermore, the size of the upper-level icon (for example, the document icon) on which the focus 230 is located is enlarged compared to that of the other upper-level icons, and the enlarged upper-level icon is displayed.

In the case where the focus 230 is located on the left one (for example, a message icon) of the plurality of upper-level icons 221 displayed on the display panel 200, as shown in FIG. 5C, there is an effect in which the view point of the background screen 210 is changed, and therefore the user seems to view the background screen 210 in the left direction thereof.

Furthermore, the size of the upper-level icon (for example, the message icon) on which the focus 230 is located is enlarged compared to that of the other upper-level icons, and the enlarged upper-level icon is displayed.

In the case where the focus 230 is located on the lower one of the plurality of upper-level icons 221 displayed on the display panel 200, as shown in FIG. 5D, there is an effect in which the view point of the background screen 210 is changed, and therefore the user seems to view the background screen 210 in the lower direction thereof. Furthermore, the size of the upper-level icon on which the focus 230 is located is enlarged compared to that of the other upper-level icons, and the enlarged upper-level icon is displayed.

Figure 6A:
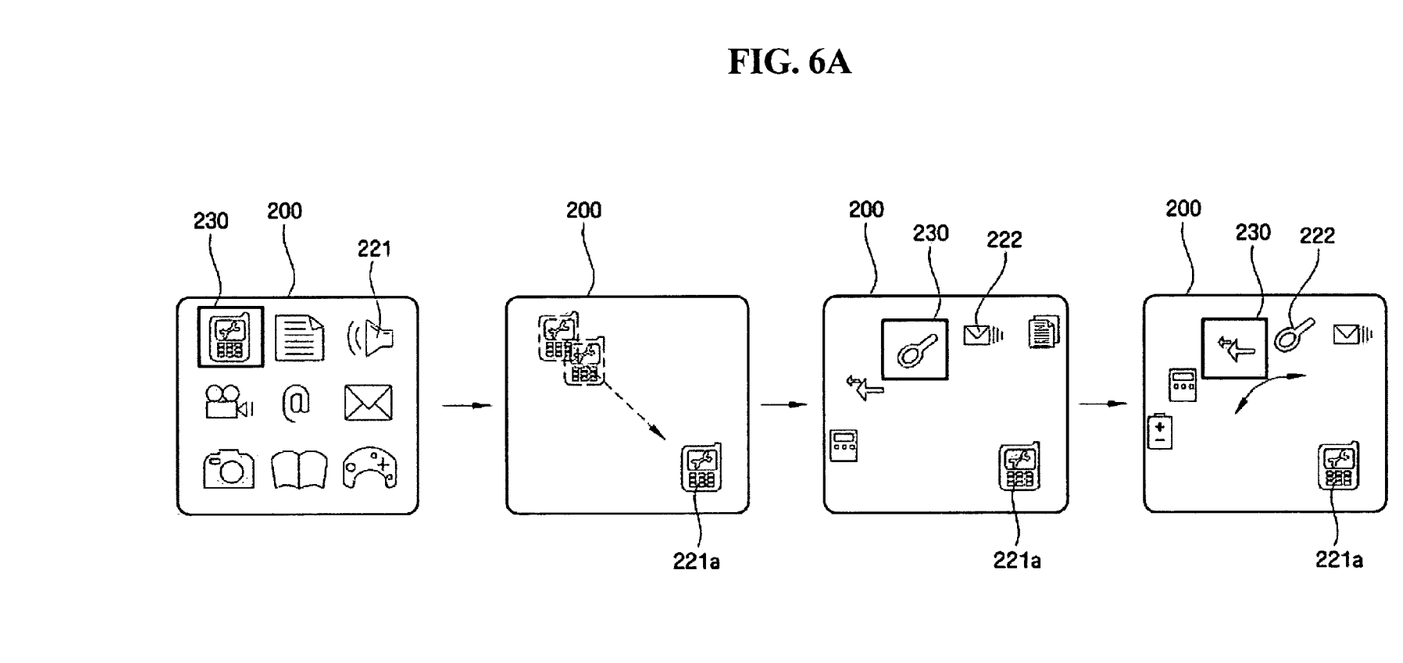
FIGS. 6A to 6C are views illustrating a process that is performed when menu icons are selected in the portable device for providing menu icons according to still another exemplary embodiment of the present invention.
Figure 6B:
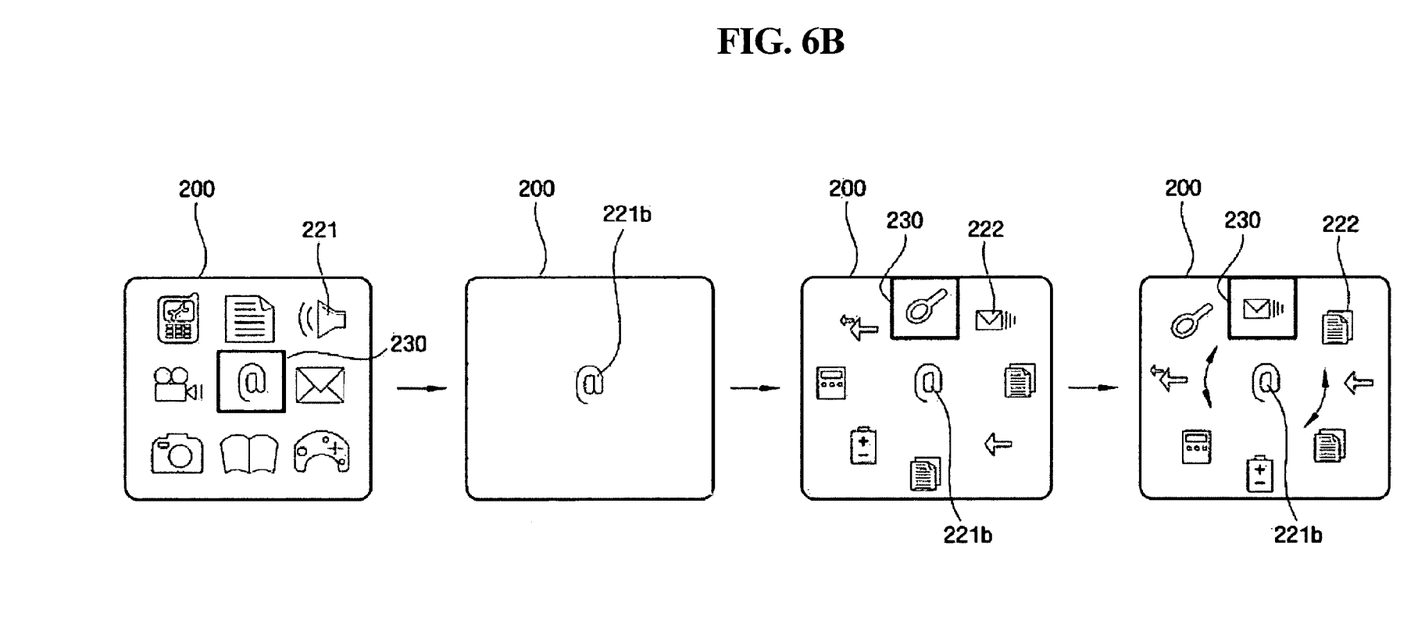
Figure 6C:
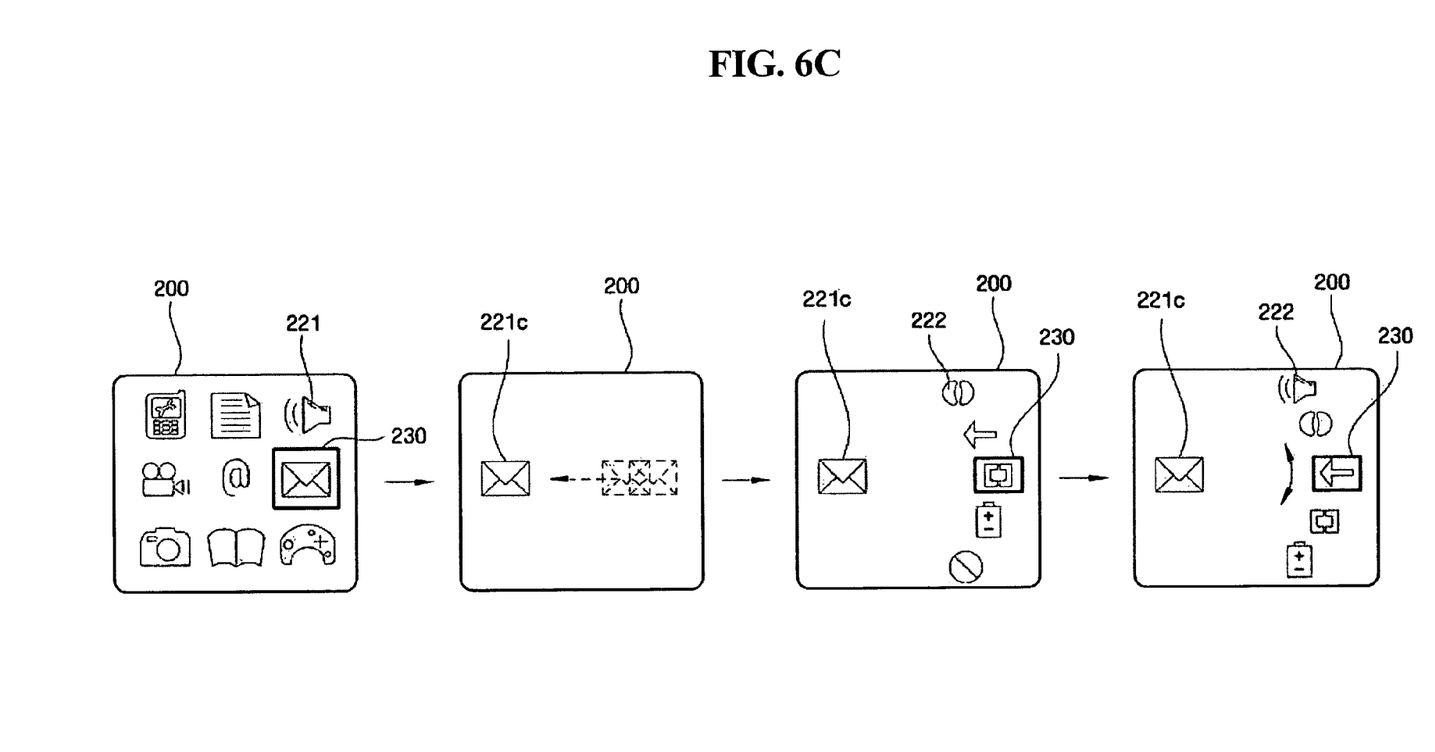

FIGS. 6A to 6C are views illustrating a process that is performed when menu icons are selected in the portable device for providing menu icons according to still another embodiment of the present invention.

When the user locates the focus 230 on the upper left one 221 of the plurality of upper-level icons 221 displayed on the display panel 200, and selects the specific upper-level icon 221a, as shown in FIG. 6A, the location of the upper-level icon 221a moves in the lower right direction ↘.

Thereafter, the plurality of lower-level icons 222 of the upper-level icon 221a is displayed around the upper-level icon 221a in the upper left region of the screen, and the focus 230 is located on one of the plurality of lower-level icons 222.

Thereafter, when the user selects a specific one from among the lower-level icons using the direction button 310, the lower-level icons 222 are rotated in the direction of the direction button 310 selected by the user. In this case, the location of the focus 230 is a specific location on the background screen 210 and the specific location of the focus 230 is not changed when the lower-level icons 222 are rotated. Accordingly, the lower-level icons 222 rotate through the fixed location of the focus 230.

When the user locates the focus 230 on the center one 221b of the plurality of upper-level icons 221 displayed on the screen of the display panel 200, and selects the upper-level icon 221b, as shown in FIG. 6B, the location of the upper-level icon 221b moves in the Z-axis direction, that is, a depth direction, "into" or "out of" the screen.

Thereafter, the plurality of lower-level icons 222 of the upper-level icon 221b are displayed around the upper-level icon 221b in a circular arrangement, and the focus 230 is then located on one of the plurality of lower-level icons 222.

Thereafter, when the user selects a specific lower-level icon using the direction button 310, the lower-level icons 222 are rotated in the direction of the direction button 310 selected by the user. In this case, the location of the focus 230 is a specific location on the background screen 210, and the specific location of the focus 230 is not changed when the lower-level icons 222 are rotated. Accordingly, the lower-level icons 222 rotate through the fixed location of the focus 230.

When the user locates the focus 230 on the right one 221c of the plurality of upper-level icons 221 displayed on the screen of the display panel 200 and selects the specific upper-level icon 221c, as shown in FIG. 6C, the location of the upper-level icon 221c moves in the left direction ←.

Thereafter, the plurality of lower-level icons 222 of the upper-level icon 221c is displayed around the upper-level icon 221c in the right region of the screen and the focus 230 is located on one of the plurality of lower-level icons 222.

Thereafter, when the user selects a lower-level icon using the direction button 310, the lower-level icons 222 are rotated in the direction of the direction button 310 selected by the user. In this case, the location of the focus 230 is a specific location on the background screen 210, and the specific location of the focus 230 is not changed when the lower-level icons 222 are rotated. Accordingly, the lower-level icons 222 rotate through the fixed location of the focus 230.

Meanwhile, when an upper-level icon 221 is selected and the lower-level icons 222 thereof are displayed, the view point of the background screen 210 is also changed to the direction in which the lower-level icons 222 are displayed.

As described above, the portable device and method of providing menu icons can have, but is not limited to, one or more of the following exemplary advantages.

There is an advantage in that upper-level icons and the lower-level icons thereof are displayed on the screen of a portable device in a hierarchical fashion. Thus, the user can be more easily aware of the locations of the icons that are currently selected.

Furthermore, the view point of the background screen can be changed to a direction identical to that of the direction button manipulated by a user, therefore the user's view seems to move together with the view point of the background screen.

Moreover, as the user's view (that is, the view point of the background screen) is changed in a 3D GUI environment, polyhedral components and menu icons are dynamically changed or information is changed, therefore information (for example, a menu icon) is optimized and then displayed to the user as the user's view point changes.

Although exemplary embodiments of the present invention have been described herein, those skilled in the art will appreciate that various modifications, additions and substitutions are possible, without departing from the scope and spirit of the invention as recited in the accompanying claims.

What is claimed is:

1. A portable device for providing menu icons, comprising:
   a button signal determination unit which, when an input button signal is received from a user, determines whether the input button signal is a signal of a function button or a signal of a direction button;
   a focus location checking unit which determines a location of a focus located on a menu icon;
   a background screen management unit which changes a view point of a background screen in accordance with a direction in which the focus is moved, such that the background screen moves in the direction in which the focus is moved and the background screen moves with respect to the menu icons, the menu icons' position being fixed; and
   an icon management unit which changes a size of a menu icon based on the location of the focus;
   wherein each of the menu icons is superimposed on the background screen, and the menu icons comprise an upper-level icon and a plurality of lower-level icons corresponding to the upper-level icon, and
   wherein the plurality of lower-level icons are disposed around the upper-level icon selected by the user and are rotated in a direction of the direction button selected by the user.

2. The portable device of claim 1, further comprising:
   a button signal input unit which receives the button signal generated by the user's manipulation of a button; and
   a display unit which displays the menu icon and the focus located on the menu icon.

3. The portable device of claim 2, wherein:
   when the upper-level icon is selected, the selected upper-level icon and lower-level icons corresponding thereto are displayed in a hierarchical fashion.

4. The portable device of claim 3, wherein movement of the upper-level icon and the lower-level icons, locations of which are moved on a screen, is displayed using a motion blur.

5. A method of controlling a portable device for providing menu icons, the method comprising:
   receiving a button signal generated through a user's manipulation of a button;
   if the input button signal is a signal of a direction button, the signal comprising an input direction, determining a location of a focus located on an upper-level icon and moving the location of the focus in the input direction;
   if the location of the focus is moved, changing a view point of a background screen in the direction of the movement of the focus, such that the background screen moves with respect to the menu icons, the menu icons' position being fixed; and
   changing a size of a menu icon based on the location of the focus;
   wherein each of the menu icons is superimposed on the background screen, and the menu icons comprise an upper-level icon and a plurality of lower-level icons corresponding to the upper-level icon, and
   wherein the plurality of lower-level icons are disposed around the upper-level icon selected by the user and are rotated in a direction of the direction button selected by the user.

6. The method of claim 5, further comprising, if the input button signal is a signal of a function button, displaying lower-level icons corresponding to the upper-level icon disposed at the location of the focus.

7. The method of claim 6, wherein the upper-level icon and the lower-level icons are displayed in a hierarchical fashion.

8. The method of claim 6, wherein movement of the upper-level icon and the lower-level icons, locations of which are moved, is displayed on a screen using a motion blur.

* * * * *